United States Patent [19]
Jenkner

[11] 3,891,700
[45] June 24, 1975

[54] PROCESS FOR THE PURIFICATION OF CRUDE TEREPHTHALIC

[75] Inventor: Herbert Jenkner, Cologne, Germany

[73] Assignee: Chemische Fabrik Kalk GmbH, Germany

[22] Filed: June 21, 1973

[21] Appl. No.: 372,317

[30] Foreign Application Priority Data
Sept. 29, 1972 Germany............................ 2247749

[52] U.S. Cl. ............................................... 260/525
[51] Int. Cl...................... C07c 63/26; C07c 51/42
[58] Field of Search..................................... 260/525

[56] References Cited
UNITED STATES PATENTS
2,879,288  3/1959  Grosskinsky et al................ 260/525
3,546,284  12/1970  List et al............................. 260/525

*Primary Examiner*—Anton H. Sutto
*Assistant Examiner*—Richard D. Kelly
*Attorney, Agent, or Firm*—Laurence, Stokes & Neilan

[57] ABSTRACT

Purification of terephthalic acid comprising reacting terephthalic acid, containing carboxybenzaldehyde, with bromine or chlorine in an aqueous alkaline solution.

9 Claims, No Drawings

PROCESS FOR THE PURIFICATION OF CRUDE TEREPHTHALIC

This invention is directed to the purification of terephthalic acid. This invention is further directed to the removal of carboxybenzaldehyde from terephthalic acid.

Terephthalic acid, which is an important intermediate product for the production of polyesters, particularly polyester fibers, is obtained mainly by oxidation of p-xylene with oxygen or air or with nitric acid. These processes, when using cobalt and bromine compounds as catalysts, give good yields of terephthalic acid. The purity of the acid obtained, however, is often insufficient for use in polymers. Very high requirements for purity are required for terephthalic acid which is to be used for the production of polyester fibers.

Among the impurities normally found, there is carboxybenzaldehyde, a partial oxidation product which has a particularly disturbing effect. Various processes have been developed for the purification of crude industrial terephthalic acid. Simple recrystallization is not sufficient, since the carboxybenzaldehyde and the terephthalic acid crystallize isomorphously. It is possible to convert and separate the carboxybenzaldehyde by hydrogenation at temperatures of above 200°C. and at pressures from 5 to 20 atm. Since the use of excess pressure and high temperatures is expensive, a search was made for a process by which terephthalic acid can be purified at standard pressure and little increased temperatures.

The present invention is directed to a process for the purification of crude terephthalic acid contaminated by carboxybenzaldehyde. This process is characterized in that the crude terephthalic acid is dissolved in an aqueous, alkaline solution and an elemental halogen added to the resultant solution. The halogen is usually, but not necessarily, added at ambient temperature. After the reaction is completed the purified terephthalic acid is separated from the solution by acidification and is obtained by conventional means.

In order to carry out the process according to the invention, the terephthalic acid, containing carboxybenzaldehyde is dissolved in an aqueous, alkaline solution such as potassium hydroxide, sodium hydroxide, ammonium hydroxide and the like. Sodium hydroxide solution in a concentration of about 1 to about 45 percent by weight NaOH is preferred. Concentrations outside this range can be utilized although it is generally not required.

Elemental halogen, preferably bromine or chlorine, is added to the reaction medium in a concentration preferably in the range of 0.01 to 10 percent by weight.

The reaction is conducted usually in the range of about 20° to 120°C. When bromine is utilized the reaction temperature is usually in the range of about 20° to 100°C. and preferably in the range of about 20° to 50°C. Higher temperatures are utilized when chlorine is used, the reaction temperature being in the range of about 50° to 120°C. and preferably about 80° to 100°C.

The reaction mixture is agitated for an additional time period of about 0.5 to 5 hours, while maintaining the desired reaction temperature.

After completion of the reaction time, the solution, without cooling, is acidified by the addition of the proper quantity of an acid, such as hydrochloric acid, phosphoric acid or sulfuric acid to such a point that the terephthalic acid, which is in solution, is again separated. After the precipitation has been completed, the solid is separated by filtration or centrifuging from the solution and is washed and dried in a known manner. According to the process of the invention, the carboxybenzaldehyde content of the crude terephthalic acid, which originally amounts up to 5000 ppm, is reduced to only about 15 ppm and the product, because of this only minimal contamination, is extremely suitable as an intermediate product for the production of polyester fibers.

A few examples will explain the process according to the invention in more detail.

EXAMPLE 1

100 parts by weight of crude terephthalic acid are dissolved in 900 parts by weight of a 1.5 molar, aqueous sodium hydroxide solution. 6.5 parts by weight of bromine are added to this solution and the mixture is heated to a temperature of 27°C. The mixture is stirred at this temperature for 2 hours, and then sufficient hydrochloric acid is added to acidify the solution whereby the dissolved terephthalic acid will again precipitate out of solution. The solid is filtered off, washed with water until free of bromide and dried. At the same time, one will obtain from a terephthalic acid which originally contained 5000 ppm carboxybenzaldehyde, a terephthalic acid with less than 15 ppm carboxybenzaldehyde.

EXAMPLE 2

In the same way as in Example 1, 100 parts by weight of crude terephthalic acid are dissolved in 900 parts by weight of a 1.5 molar aqueous sodium hydroxide solution and 6.5 parts by weight of bromine are added to the solution. This mixture is then heated to 100°C, stirred subsequently for 2 hours at this temperature and then without cooling acidified by adding hydrochloric acid whereby the dissolved terephthalic acid is again separated. As compared to the method of operation according to Example 1, in this case the terephthalic acid will be obtained in a particularly well filterable form. The contents of carboxybenzaldehyde likewise amounts to less than 15 ppm.

EXAMPLE 3

100 parts by weight of a crude terephthalic acid are dissolved in 900 parts by weight of 1.5 molar aqueous sodium hydroxide solution. 2.9 parts by weight chlorine are introduced in this solution and the mixture is heated to a temperature of 25°C. At this temperature, the mixture is stirred for 2 hours, subsequently enough hydrochloric acid is added so that the solution shows an acid reaction, whereby the dissolved terephthalic acid is again precipitated. The solid is filtered off, washed with water until free of chloride and dried. The purity examination shows that in the case of this method of operation the content of carboxybenzaldehyde was lowered from 5000 ppm only to 2000 ppm.

Increasing the reaction temperature will result in a purer product as illustrated in Example 4.

EXAMPLE 4

In the same manner as in Example 3, 100 parts by weight of a crude terephthalic acid are dissolved in 900 parts by weight of a 1.5 molar, aqueous sodium hydroxide solution and 2.9 parts by weight of chlorine are introduced into the solution. This mixture is then heated to 100°C., is stirred subsequently at this temperature for 2 hours and the dissolved terephthalic acid is again separated without cooling by the addition of hydrochloric acid. The terephthalic acid which, similarly as in Example 2, is again obtained in a particularly well filterable form, shows a drop in the content of carboxybenzaldehyde from 5000 ppm to less than 15 ppm.

I claim:

1. A process for the purification of crude terephthalic acid containing carboxybenzaldehyde as an impurity to substantially pure terephthalic acid useful in the production of fibers, which comprises dissolving said crude terephthalic acid in an aqueous alkaline hydroxide solution selected from the group consisting of sodium hydroxide, potassium hydroxide and ammonium hydroxide solutions; adding an elemental halogen selected from the group consisting of bromine and chlorine to the resultant solution; maintaining said resultant solution at a reaction temperature of about 20°–120°C. for a period of time sufficient for said halogen to react with said impurity; acidifying the reaction mixture; and separating the purified terephthalic acid from said acidified mixture.

2. A process for the purification of terephthalic acid, according to claim 1 in which said halogen is bromine.

3. A process for the purification of terephthalic acid, according to claim 2, in which the reaction temperature is in the range of about 20° to 100°C.

4. A process for the purification of terephthalic acid, according to claim 3, in which the reaction temperature is in the range of about 20° to 50°C.

5. A process for the purification of terephthalic acid, according to claim 1, in which said halogen is chlorine.

6. A process for the purification of terephthalic acid, according to claim 5, in which the reaction temperature is in the range of about 50° to 120°C.

7. A process for the purification of terephthalic acid, according to claim 6, in which the reaction temperature is in the range of about 80° to 100°C.

8. A process for the purification of terephthalic acid, according to claim 1, in which said reaction temperature is maintained for about 0.5 to about 5 hours.

9. A process for the purification of terephthalic acid, according to claim 1, wherein the reaction conditions are maintained until the amount of inpurity is reduced to about 15 parts per million.

* * * * *